(12) United States Patent
Sakaguchi et al.

(10) Patent No.: US 7,641,824 B2
(45) Date of Patent: Jan. 5, 2010

(54) APPARATUS FOR PREPARING INORGANIC SPHEROIDIZED PARTICLE

(75) Inventors: Mikio Sakaguchi, Wakayama (JP); Kunio Fujii, Osaka (JP); Kenichi Tomozawa, Osaka (JP)

(73) Assignee: KAO Corporation, Tokyo (JP)

( * ) Notice: Subject to any disclaimer, the term of this patent is extended or adjusted under 35 U.S.C. 154(b) by 725 days.

(21) Appl. No.: 11/288,257

(22) Filed: Nov. 29, 2005

(65) Prior Publication Data
US 2006/0112784 A1 Jun. 1, 2006

(30) Foreign Application Priority Data
Nov. 30, 2004 (JP) ............... 2004-345132

(51) Int. Cl.
*B29B 9/16* (2006.01)
(52) U.S. Cl. .................... 264/15; 425/6; 431/8
(58) Field of Classification Search ............. 264/15
See application file for complete search history.

(56) References Cited

U.S. PATENT DOCUMENTS

| | | | | |
|---|---|---|---|---|
| 3,272,615 A | * | 9/1966 | Beeton et al. | ............ 75/308 |
| 4,089,628 A | | 5/1978 | Blackburn | |
| 4,616,779 A | | 10/1986 | Serrano et al. | |
| 5,558,822 A | * | 9/1996 | Gitman et al. | ............ 264/15 |
| 5,605,103 A | | 2/1997 | Larue | |
| 5,611,833 A | * | 3/1997 | Brahmbhatt et al. | ...... 65/21.3 |
| 2002/0024161 A1 | * | 2/2002 | Konya et al. | ............ 264/15 |
| 2006/0108724 A1 | * | 5/2006 | Sato et al. | ............ 266/217 |

FOREIGN PATENT DOCUMENTS

| | | |
|---|---|---|
| JP | 7-247105 A | 9/1995 |
| JP | 2000-346318 A | 12/2000 |
| JP | 3312228 B2 | 8/2002 |

OTHER PUBLICATIONS

English language abstract of JP 2002166161 (Jun. 11, 2002).
English language abstract of JP 2000346318 (Dec. 15, 2000).
English language abstract of JP 11 199219 A (Jul. 27, 1999).
Ramachandran, V.S., Concrete Admixtures Handbook, pp. 310, (1984).

* cited by examiner

*Primary Examiner*—Mary Lynn F Theisen
(74) *Attorney, Agent, or Firm*—Birch, Stewart, Kolasch & Birch, LLP

(57) ABSTRACT

An apparatus for preparing an inorganic spheroidized particle, wherein an inorganic powder is fed from a feed pathway for an inorganic powder to a combustion flame in a powder melting furnace, and melted or softened and spheroidized, and wherein the apparatus comprises a powder dispersing plate in the feed pathway for an inorganic powder; and a process for preparing an inorganic spheroidized particle comprising the step of preparing inorganic spheroidized particles with the apparatus for preparing inorganic spheroidized particles as defined above. The inorganic spheroidized particle prepared by the above process and apparatus can be suitably used for a spherical molding sand, a filler, a pigment or the like, especially in the case where the inorganic spheroidized particle is a ceramics particle.

9 Claims, 4 Drawing Sheets

APPARATUS FOR PREPARING INORGANIC SPHEROIDIZED PARTICLE

FIELD OF THE INVENTION

The present invention relates to an apparatus for preparing an inorganic spheroidized particle and a process for preparing an inorganic spheroidized particle.

BACKGROUND OF THE INVENTION

An inorganic spheroidized particle is generally prepared by passing a raw material powder (having the same meaning as "inorganic powder" as used herein) through a combustion flame (combustion gas) at a temperature equal to or higher than the melting temperature of the raw material powder with a combustion apparatus (gas combustion burner), and melting or softening and spheroidizing the raw material powder in a powder melting furnace. Studies have been conducted for efficiently melting or softening and spheroidizing the raw material powder and stabilizing a high spheroidization percentage thereof.

JP2002-166161 A discloses an apparatus for preparing an inorganic spheroidized particle in which the inorganic spheroidized particle is prepared while keeping an ambient temperature (combustion gas temperature) within a given temperature range in the region of flame formation of a powder melting furnace.

JP2000-346318 A discloses a burner for spherical particles comprising a specified flame keeping plate and a dispersing means having a specified form inside the short tip portion of a feed pipe for a raw material powder.

SUMMARY OF THE INVENTION

The present invention relates to:
(1) an apparatus for preparing an inorganic spheroidized particle, wherein an inorganic powder is fed from a feed pathway for an inorganic powder to a combustion flame in a powder melting furnace, and melted or softened and spheroidized, and wherein the apparatus comprises a powder dispersing plate in the feed pathway for an inorganic powder, and
(2) a process for preparing an inorganic spheroidized particle including the step of preparing an inorganic spheroidized particle with the apparatus for preparing an inorganic spheroidized particle as defined in the above item (1).

Figure 1:
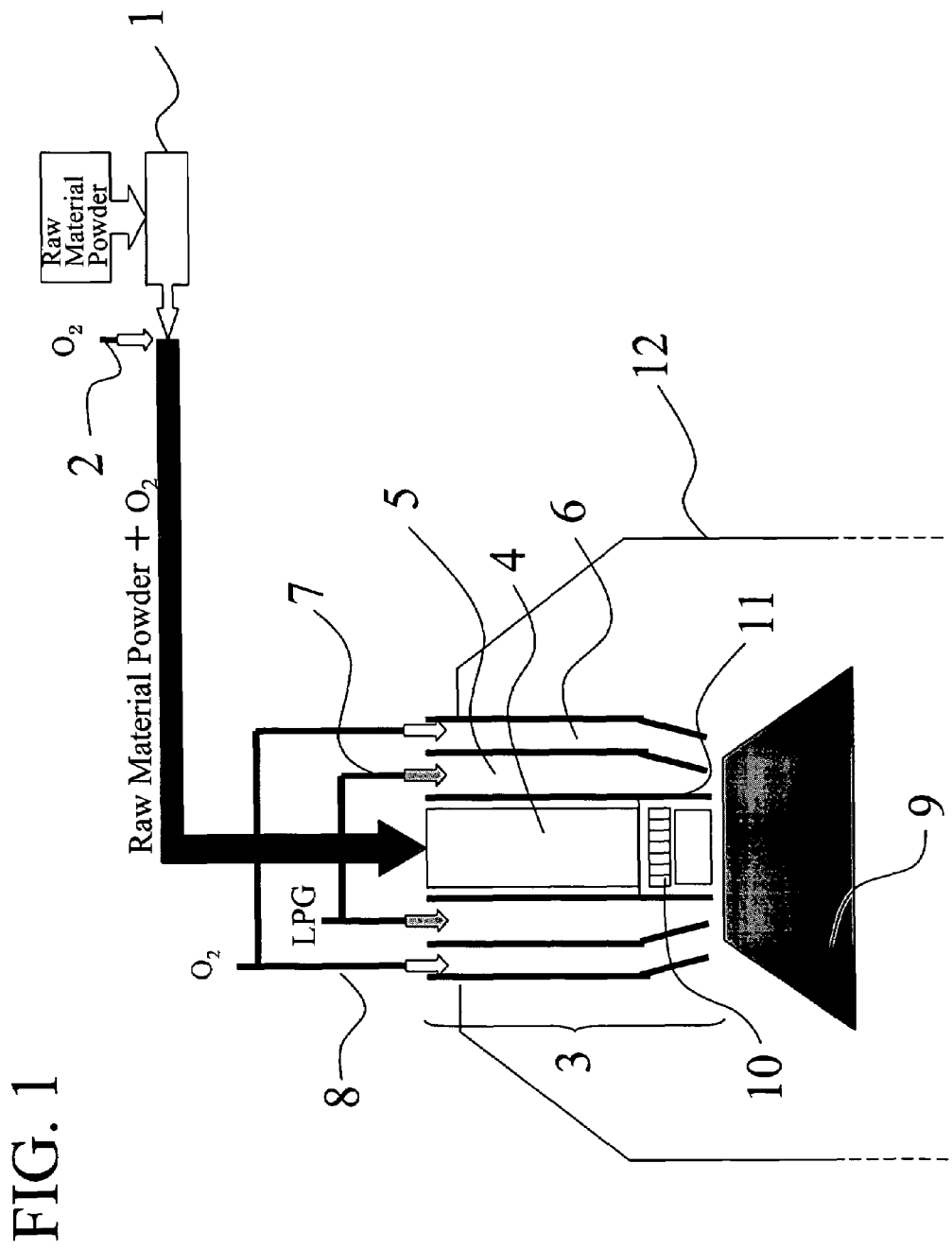
FIG. 1 is a schematic view showing one example of an apparatus for preparing an inorganic spheroidized particle of the present invention.

The numerals in the figures are as follows:
1 is a feeder for a raw material powder, 2 a feed pathway for a raw material transporting gas, 3 a combustion apparatus (gas combustion burner), 4 a feed pathway for a raw material powder, 5 a feed pathway for a fuel gas, 6 a feed pathway for a combustion gas, 7 a feed pipe for a fuel gas, 8 a feed pipe for a combustion gas, 9 a combustion flame, 10 A, B powder dispersing plates, 11 a gas nozzle, 12 a powder melting furnace, and 13 an outer sleeve of a combustion apparatus.

DETAILED DESCRIPTION OF THE INVENTION

The present invention relates to an apparatus for preparing an inorganic spheroidized particle capable of efficiently preparing excellent an inorganic spheroidized particle having a high spheroidization percentage even when a raw material powder contains particles having large sizes, and a process for preparing an inorganic spheroidized particle.

According to the present invention, an apparatus for preparing an inorganic spheroidized particle is provided, which can be suitably used even when the raw material powder contains particles having large sizes. According to the apparatus, an excellent inorganic spheroidized particle having a high spheroidization percentage can be efficiently prepared even when a raw material powder contains particles having large sizes.

These and other advantages of the present invention will be apparent from the following description.

In the preparation of the inorganic spheroidized particle by melting or softening and spheroidization, in an apparatus which has been conventionally studied to efficiently stabilize a high spheroidization percentage of the particles, an apparatus disclosed, for example, in JP2002-166161 A, the apparatus comprises a temperature-controlling mechanism as an essential constituent, so that the constitution of the apparatus must become somewhat complicated. In the apparatus disclosed in JP2000-346318 A, the residence state of a raw material powder when the raw material powder is jetted into a flame is unstable, so that there poses a limitation in the stability in the spheroidization percentage. In particular, the apparatus is insufficient for stabilizing the spheroidization percentage in a high value when the raw material powder contains particles having large particle sizes having an average particle size of 50 μm or more.

The term "inorganic spheroidized particle" as used herein refers to particles prepared from an inorganic powder containing the component represented by the following formula:

$$xA_mO_n \cdot yB_pO_q \qquad (1)$$

wherein each of A and B is an arbitrary metal atom; x is a number satisfying the formula $x \geq 1$; y is a number satisfying the formula $y \geq 0$; and each of m, n, p and q is a number satisfying the formula $m \geq 1$, $n \geq 1$, $p \geq 1$, and $q \geq 1$, respectively. The component represented by the formula (1) includes, for example, $Al_2O_3$, $SiO_2$, $MgO$, $TiO_2$, $3Al_2O_3 \cdot 2SiO_2$, $MgO \cdot Al_2O_3$, $MgO \cdot SiO_2$, $2MgO \cdot SiO_2$, $ZrO_2 \cdot SiO_2$, and the like.

One of the largest features of the apparatus for preparing an inorganic spheroidized particle of the present invention resides in that the apparatus comprises a given powder dispersing plate in a feed pathway for an inorganic powder in a combustion apparatus. Although not wanting to be limited by theory, the raw material powder is fed to a powder melting furnace in a dispersion state in a raw material transporting gas via the feed pathway for an inorganic powder of the combustion apparatus. Upon feeding, if the dispersibility of the raw material powder is poor, the particles of the raw material powder are fused with each other in the process of spheroidization, thereby causing defective shapes, to form particles having large sizes. In addition, when the supplying rate of the raw material powder is high and the residence time of the raw material powder in the powder melting furnace is short, the raw material powder is not sufficiently spheroidized, so that a high-quality inorganic spheroidized particle cannot be obtained. These tendencies are remarkable particularly when the raw material powder contains particles having large sizes. In the apparatus of the present invention, since the raw material powder is introduced into the powder melting furnace via a given powder dispersing plate in the feed pathway for an inorganic powder inside the combustion apparatus, the raw material powder can be fed into a combustion flame in a well dispersed state. Moreover, it is presumed that since the raw material powder collides with the powder dispersing plate, the supplying rate of the raw material powder to the powder melting furnace is lowered, so that the raw material powder can be maintained in the combustion flame in an appropriate residence time. Therefore, according to the apparatus of the present invention, an excellent inorganic spheroidized particle which is composed of monodisperse particles and has a high spheroidization percentage can be efficiently prepared, even when the raw material powder contains particles having large sizes. In the process for preparing an inorganic spheroidized particle of the present invention, the apparatus for preparing an inorganic spheroidized particle is used. According to the method, excellent inorganic spheroidized particle as described above can be efficiently prepared.

The term "spheroidization percentage" as used herein refers to a weight percentage (%) of particles having a spherical degree of 0.98 or more in the inorganic spheroidized particle. The spherical degree is obtained by the following method: The image taken by an optical microscope or a digital scope (for example, commercially available from KEYENCE, Model VH-8000) is obtained, and the image obtained is subjected to image analysis to obtain an area of particle projected section of the particle and a peripheral length thereof, followed by calculation of [peripheral length (mm) of complete round having the same area as the area ($mm^2$) of particle projected section]/[peripheral length (mm) of particle projected section], and then averaging respectively obtained values selected from arbitrary 50 inorganic spheroidized particles.

The phrase "inorganic spheroidized particle which is composed of monodisperse particles" refers to an inorganic spheroidized particle in which the particles of the raw material powder are not substantially fused with one another, but the particles are obtained for each of the corresponding raw material powders. Whether or not the inorganic spheroidized particle is in a state described above can be easily grasped by observing the images of the particles with an optical microscope or a digital scope (for example, "VH-800," commercially available from KEYENCE).

The term "average particle size" as used herein is obtained as follows: Specifically, when the spherical degree is 1 according to a particle projected section of an inorganic spheroidized particle, its diameter (mm) is measured; when the spherical degree is less than 1, the major axis diameter (mm) and minor axis diameter (mm) of a randomly aligned inorganic spheroidized particle are measured to obtain the value of (major axis diameter+minor axis diameter)/2; and then the respectively obtained values arbitrarily selected from 100 numbers of the inorganic spheroidized particles, are averaged to obtain an average particle size (mm). The major axis diameter and the minor axis diameter are defined as follows: When a particle is stably placed on a plane and then a projection image thereof on the plane is edged with a pair of parallel lines, the width of the particle which makes distance between the pair of parallel lines minimum is defined as the minor axis diameter; on the other hand, the distance between another pair of parallel lines which edge the particle in the direction orthogonal to the former pair of parallel lines is defined as the major axis diameter. The major axis diameter and the minor axis diameter of the inorganic spheroidized particle can be obtained by obtaining an image (photograph) of the particle and subjecting the obtained image to image analysis. Incidentally, in the case of the raw material powder, "the average particle size" is obtained in the same manner.

Specifically, the apparatus for preparing an inorganic spheroidized particle of the present invention refers to an apparatus wherein an inorganic powder is fed from a feed pathway for an inorganic powder to a powder melting furnace, passed through a combustion flam in the melting furnace, and melted or softened and spheroidized, and wherein the apparatus comprises a powder dispersing plate in the above feed pathway for an inorganic powder. The apparatus of the present invention can be produced in accordance with that of the conventional apparatus for preparing an inorganic spheroidized particle.

The apparatus and the process of the present invention will be described more specifically by means of preferred embodiments given hereinbelow, without intending to limit the present invention to those specifically embodied herein.

The apparatus of the present invention comprises a combustion apparatus and a powder melting furnace. It is preferable that the combustion apparatus has a multiple-pipe structure, more preferably a concentric multiple-pipe structure, comprising a feed pathway for an inorganic powder, a feed pathway for a fuel gas arranged in the outer circumference of the feed pathway for an inorganic powder, and a feed pathway for a combustion gas arranged in the outer circumference of the feed pathway for a fuel gas, in this order from the center, wherein the apparatus comprises the powder dispersing plate in the above feed pathway for an inorganic powder. Here, a connection between the combustion apparatus and the powder melting furnace is made via the jetting ports of the feed pathway for an inorganic powder, the feed pathway for a fuel gas and the feed pathway for a combustion gas of the combustion apparatus.

The attachment positions and the number of the powder dispersing plates in the feed pathway for an inorganic powder are not particularly limited. It is preferable that at least one powder dispersing plate is attached to the vicinity of one end of the feed pathway for an inorganic powder on the side of the powder melting furnace, from the viewpoint of feeding a raw material powder in a combustion flame in a more excellent dispersion state and maintaining the raw material powder in the combustion flame for a more appropriate residence time.

Here, the phrase "the vicinity of one end of the feed pathway for an inorganic powder on the side powder melting furnace" refers to a position on the side of the feed pathway for an inorganic powder away from the center of a vertical cross section in a longitudinal direction of the feed pathway at one end of the feed pathway on the side of the powder melting furnace in a length in a straight line distance, corresponding to the range of from exceeding 0% to 20% of an entire length of the feed pathway, preferably a position on the side of the feed pathway away from the center in a longitudinal direction of the feed pathway in a length corresponding to 1 to 10% of an entire length.

The feed pathway for an inorganic powder usually comprises a gas nozzle attached to a tip end portion of a cylindrical pipe. The gas nozzle is positioned on the side of the powder melting furnace in the feed pathway for an inorganic powder, and one end of the gas nozzle on the side of the powder melting furnace corresponds to one end of the feed pathway for an inorganic powder on the side of the powder melting furnace. Therefore, a specific embodiment where at least one powder dispersing plate is attached to the vicinity of one end of the feed pathway for an inorganic powder on the side of the powder melting furnace includes an embodiment where at least one powder dispersing plate is attached inside the gas nozzle. It is preferable that one powder dispersing plate is attached inside the gas nozzle, and it is more preferable that two powder dispersing plates are attached inside the gas nozzle, from the viewpoint of dispersibility of the raw material powder and more stabilization of the retention state in the flame. When two or more powder dispersing plates are attached, it is preferable that each of the powder dispersing plates is attached so as not make contact with each other.

FIG. 1 is a schematic view showing one example of the apparatus of the present invention, wherein one powder dispersing plate is attached to the vicinity of one end of a feed pathway for an inorganic powder on the side of the powder melting furnace. In the figure, a powder dispersing plate 10 is attached inside a gas nozzle 11. In FIG. 1, a raw material powder is discharged in a given amount at a time from a feeder 1 for a raw material powder, transported by a raw material transporting gas (oxygen or oxygen-rich air; oxygen in the figure) introduced from a feed pathway 2 for a raw material transporting gas, and fed to a feed pathway for a raw material powder 4 inside a combustion apparatus 3. In the mid-course of the pipe connecting the feeder 1 for a raw material powder and the feed pathway 4 for a raw material powder, at least one powder dispersing plate similar to the powder dispersing plate of the present invention may be attached as desired. FIG. 1 schematically shows a combustion apparatus 3 by taking its cross section. A fuel gas (propane, butane, methane, LPG or the like) and a combustion gas (oxygen or oxygen-rich air) are introduced from each of the feeding sources to a feed pipe 7 for a fuel gas and a feed pipe 8 for a combustion gas, and fed to a feed pathway 5 for a fuel gas and a feed pathway 6 for a combustion gas inside the combustion apparatus 3, respectively. The combustion apparatus 3 is connected to a powder melting furnace 12, and a combustion flame 9 is formed inside the powder melting furnace 12. The raw material powder fed to the feed pathway 4 for a raw material powder inside the combustion apparatus 3 is jetted into the combustion flame 9 by the raw material transporting gas via the powder dispersing plate 10 in the feed pathway 4 for a raw material powder. The raw material powder is then melted or softened and spheroidized by surface tension.

Figure 2:
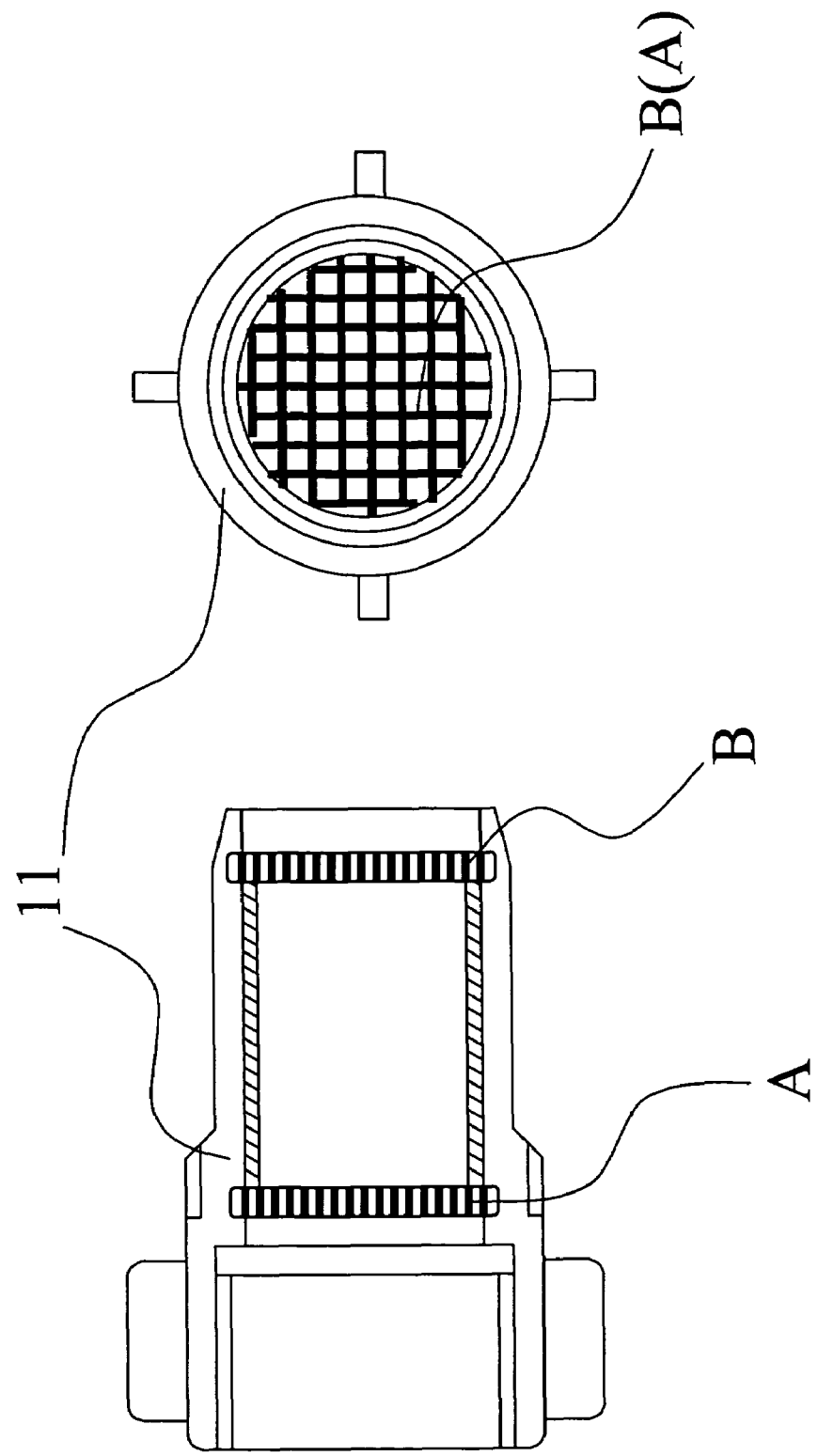
FIG. 2 is a cross-sectional view of an example of a gas nozzle which is used for the apparatus for preparing an inorganic spheroidized particle of the present invention, the gas nozzle comprising two powder dispersing plates (left figure), and the gas nozzle viewed from a side of a powder melting furnace (right figure)

In addition, FIG. 2 shows an example of the gas nozzle which is used for the apparatus of the present invention comprising two powder dispersing plates, wherein the left figure shows a cross section of the gas nozzle, and the right figure shows the gas nozzle viewed from the side of the powder melting furnace. In the figure, two powder dispersing plates A and B are attached inside the gas nozzle 11 so as to be away in a farthest distance from each other. When the two powder dispersing plates are attached inside the gas nozzle, it is even more preferable that the powder dispersing plates are attached in the manner described above.

Figure 3:
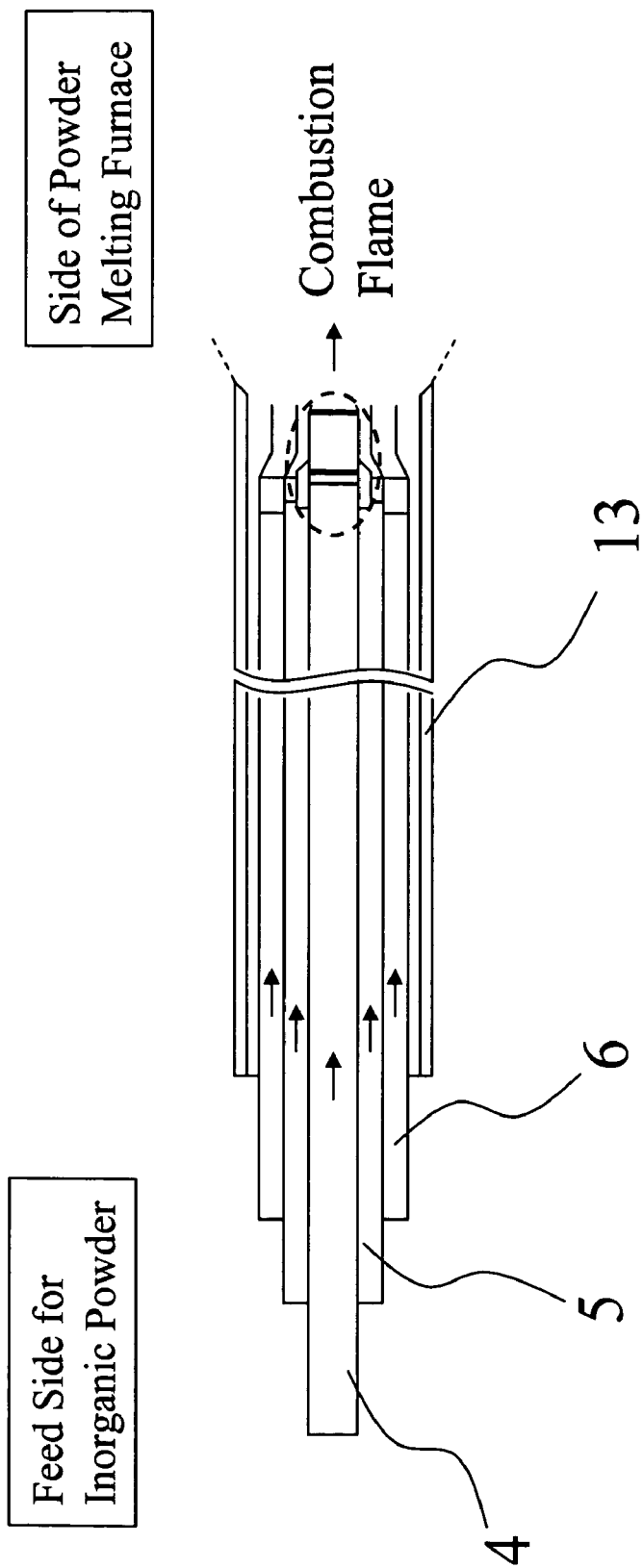
FIG. 3 is a schematic view showing more specifically one example of a combustion apparatus 3 shown in FIG. 1 which is taken in a horizontal direction.

FIG. 3 is a schematic view showing more specifically one example of a combustion apparatus 3 shown in FIG. 1 which is taken in a horizontal direction (the portion indicated by broken lines in FIG. 1 being omitted). In the figure, the left side is a feed side for an inorganic powder of the feed pathway for an inorganic powder (feed pathway 4 for a raw material powder), and the right side is a side of the powder melting furnace of the feed pathway for an inorganic powder (feed pathway 4 for a raw material powder). Each of the arrows indicates the direction of a raw material powder passing through the feed pathway 4 for a raw material powder, the direction of a fuel gas passing through a feed pathway 5 for a fuel gas, and the direction of a combustion gas passing through a feed pathway 6 for a combustion gas. In addition, 13 is an outer sleeve of the combustion apparatus for covering an outside of the feed pathway 6 for a combustion gas. The gas nozzle is usually attached at the position shown by a broken line drawn in an elliptic shape.

Further, at least one powder dispersing plate may be attached to the vicinity of one end of the feed pathway for an inorganic powder on the side of an inorganic powder supply. In this case, the powder dispersing plate is attached inside a cylindrical pipe constituting the feed pathway for an inorganic powder. Here, the phrase "the vicinity of one end of the feed pathway for an inorganic powder on the side of an inorganic powder" is a position on the side of the feed pathway for an inorganic powder on the feed side of an inorganic powder away from the center of the vertical cross section in a longitudinal direction of the feed pathway at one end of the feed pathway in a straight line a length corresponding to the range of from exceeding 0% to 20% of an entire length of the feed pathway, preferably a position on the side of the feed pathway away from the center in a longitudinal direction of the feed pathway in a straight line a length corresponding to 1% to 10% of an entire length. When the powder dispersing plate is attached inside the cylindrical pipe, it is preferable that one powder dispersing plate is attached inside the gas nozzle, and it is more preferable that two powder dispersing plates are attached inside the gas nozzle, from the viewpoint of further stabilizing the dispersibility of the raw material powder and the residence state of the raw material powder in flame.

Therefore, it is preferable that the apparatus of the present invention comprises at least one powder dispersing plate attached to the vicinity of one end of the feed pathway for an inorganic powder on the feed side of an inorganic powder, and at least one powder dispersing plate attached to the vicinity of one end of the feed pathway for an inorganic powder on the side of the powder melting furnace.

The attachment state of the powder dispersing plate is not particularly limited. From the viewpoint of even more stabilizing the dispersibility of the raw material powder and the residence state of the raw material powder in flame, it is preferable that the powder dispersing plate is attached nearly perpendicular to the longitudinal direction of the feed pathway for an inorganic powder and in a state matching the shape of the cross section of the feed pathway for an inorganic powder in a direction perpendicular to the longitudinal direction of the feed pathway for an inorganic powder at the attachment position.

From the viewpoint of even more stabilizing the dispersibility of the raw material powder and the residence state of the raw material powder in flame, a preferred structure of the powder dispersing plate will be described below. The porosity of the powder dispersing plate is preferably from 25 to 95%, more preferably from 40 to 90% and even more preferably from 50 to 85%. In addition, the average pore size, in terms of a diameter calculated as a circle, which refers to a diameter of a circle having the same pore area, is preferably from 0.1 to 5 mm, more preferably from 0.2 to 4 mm, and even more preferably from 0.5 to 3 mm. The maximum pore size of the powder dispersing plate, in terms of a diameter calculated as a circle, is preferably from 1 to 30 mm, and more preferably from 2 to 20 mm. The thickness of the powder dispersing plate is preferably from 5 to 50%, and more preferably from 10 to 40%, when expressed as a ratio of the thickness to the maximum pore size in terms of a diameter calculated as a circle of the powder dispersing plate (thickness/size which is a diameter calculated as circle).

The porosity of the powder dispersing plate as referred to herein is defined as a ratio of an entire orthogonal projection area of porous portion of the powder dispersing plate occupied in an entire orthogonal projection area of the powder dispersing plate (the entire orthogonal projection area of the porous portion/the entire orthogonal projection area of the powder dispersing plate). The average pore size is defined as an average of a diameter calculated as a circle of all the pores in the porous portion. The maximum pore size in the powder dispersing plate calculated as a circle is defined as a maximum diameter calculated as a circle of all the pores in the porous portion. The diameter calculated as a circle of the porous portion of the powder dispersing plate is defined as a diameter of the circle having the same area as that of the orthogonal projection area of the porous portion.

The shape of the powder dispersing plate includes, for example, a mesh form, a lotus root form containing circular or elliptical pores, a honeycomb form, a form containing pores with an indefinite or irregular shape, and the like, without particularly limited thereto. However, at least one form selected from the group consisting of a mesh form, a lotus root form and a honeycomb form is preferable from the viewpoint of ease in production. When the raw material powder contains particles having large sizes, the lotus root form and/or the honeycomb form are more preferable, and the lotus root form is even more preferable, from the viewpoint of obtaining an excellent inorganic spheroidized particle having a higher spheroidization percentage. In the case where two or more powder dispersing plates are attached to the feed pathway for an inorganic powder, the powder dispersing plates having the same or different shapes can be used as desired. A combination of powder dispersing plates in which the average pore size is large in a powder dispersing plate on the feed side of an inorganic powder, and the average pore size is small in a powder dispersing plate on the side of the powder melting furnace is preferable.

Figure 4:
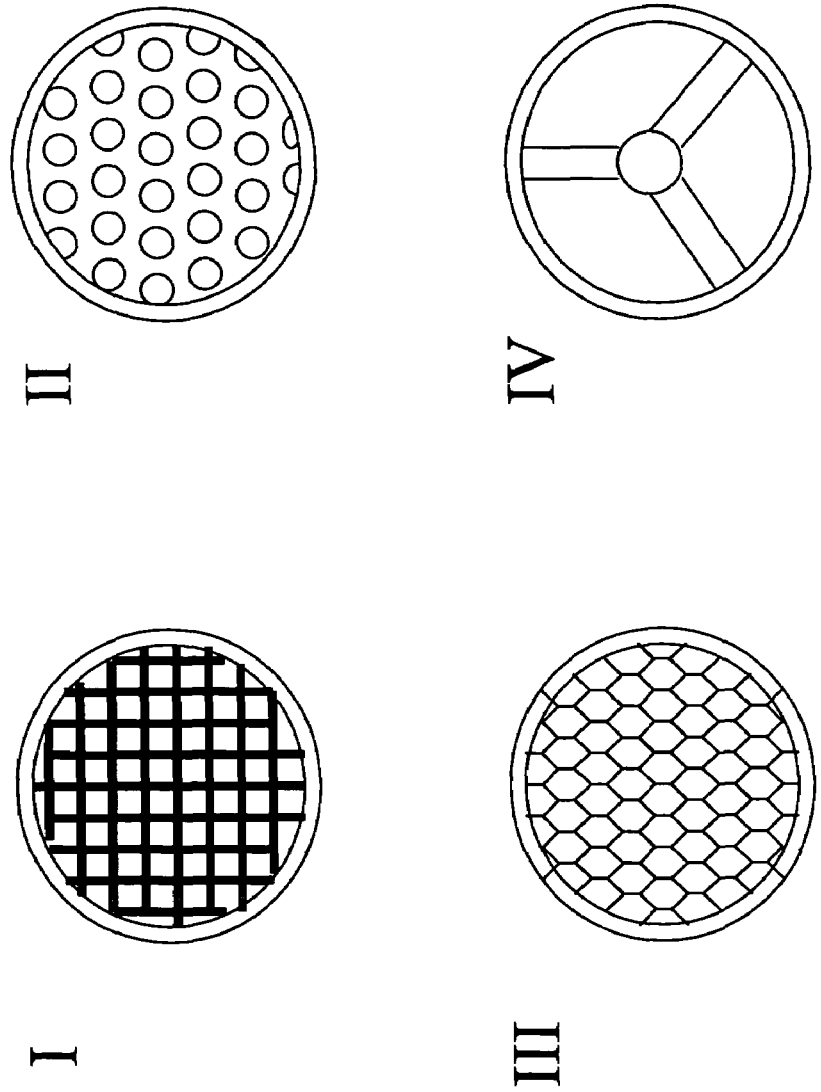
FIG. 4 is a view showing one example of the powder dispersing plates of the present invention, having a mesh form (I), a lotus root form (II) containing circular or elliptical pores, a honeycomb form (III) and a form (IV) containing pores with an indefinite shape.

FIG. 4 exemplifies the powder dispersing plates of the present invention, having a mesh form (I), a lotus root form (II), a honeycomb form (III) and a form (IV) having pores with an indefinite shape.

The apparatus of the present invention may be operated in accordance with a conventional method. It is preferable that the flow rate and the like of the raw material transporting gas satisfy the conditions given below.

The raw material powder as referred to herein is not particularly limited, as long as the raw material powder is used as a raw material of an inorganic spheroidized particle. The raw material powder includes, for example, oxides and double oxides, such as $Al_2O_3$, $SiO_2$, mullite ($3Al_2O_3 \cdot 2SiO_2$), $TiO_2$ and spinel ($MgO \cdot Al_2O_3$), and the like. In addition, the form of the raw material powder fed to the apparatus of the present invention is not particularly limited.

The raw material powder is fed to the combustion apparatus, accompanying the raw material transporting gas, and reaches the powder dispersing plate in the feed pathway for an inorganic powder. The flow rate of the raw material transporting gas at that time is preferably from 2 to 20 m/sec, and more preferably from 5 to 10 m/sec. As long as the flow rate of the raw material transporting gas is within the above range, a sufficient dispersibility is obtained when the raw material powder collides with the powder dispersing plate. In addition, the rate of the raw material powder is decelerated, and the residence time in the powder melting furnace becomes favorable. The degree of the deceleration is not particularly limited. When the rate of the particles of the raw material powder before the particles pass through the powder dispersing plate is defined as $I_o$. and the rate of the particles of the raw material powder after the particles pass through the powder dispersing plate is defined as I, it is preferable that a ratio thereof, i.e. $I/I_o$ (%) satisfies the formula, $I/I_o=50\%$. The ratio $I/I_o$, is calculated by measuring the rate of the raw material powder before and after passing the powder dispersing plate. The passing rates are obtained by, for example, an optical means (for example, a high-speed camera or the like). The concentration of the raw material powder in the raw material transporting gas is preferably from 0.1 to 10 $kg/Nm^3$, and more preferably from 0.5 to 5 $kg/Nm^3$. The residence time in the powder melting furnace is the time passed between the arrival of the raw material powder at the powder melting furnace and the dispersion of the spheroidized and melted particles to the outside of the combustion flame, and is preferably from 0.001 to 5 seconds or so. The temperature of the combustion flame is not particularly limited, and it is preferable that the temperature is usually from 1500° to 3000° C. or so.

According to the apparatus of the present invention, an excellent inorganic spheroidized particle, which is, for example, composed of monodisperse particles, and has a high spheroidization percentage and an average particle size of about 1 to about 500 μm can be efficiently prepared. The average particle size of the raw material powder does not substantially undergo changes even after the raw material powder has passed through the apparatus. The average particle size of the raw material powder is substantially the same as the average particle size of the inorganic spheroidized particle obtained.

Next, the process for preparing an inorganic spheroidized particle using the apparatus for preparing an inorganic spheroidized particle of the present invention will be described hereinbelow.

The process of the present invention is carried out by preparing an inorganic spheroidized particle using the apparatus of the present invention in accordance with the process for operating the conventional apparatus for preparing an inorganic spheroidized particle, preferably under the above favorable conditions, such as the flow rate of the raw material transporting gas.

According to the process of the present invention, a spherical molding sand disclosed in, for example, JP2004-202577 A, which is excellent in fluidity, and has high strength and surface smoothness, suitable for producing a casting mold, can be efficiently prepared. A reference should be made to the above publication for the details of the preparation conditions.

The spherical molding sand thus obtained is very excellent in fluidity, which can be used alone or in a proper mixture prepared by mixing the molding sand with a known molding sand so as to contain the molding sand in a given ratio. When the molding sand is used for producing a casting mold, the amount of a binder to be used can be reduced, whereby the molding sand can be reproduced efficiently as a molding sand. The spherical molding sand can be preferably used for casting a mold for casting cast steel, cast iron, aluminum, copper and alloys thereof or the like, or the molding sand can also be used as fillers for metals, plastics, and the like.

EXAMPLES

The following examples further describe and demonstrate embodiments of the present invention. The examples are given solely for the purposes of illustration and are not to be construed as limitations of the present invention.

Examples 1 to 10 and Comparative Examples 1 to 5

An apparatus for preparing inorganic spheroidized particles of the same model as the apparatus shown in FIG. 1, having the number of powder dispersing plates, attachment positions and properties thereof as listed in Table 1 given below, was produced. The inorganic spheroidized particles were prepared by using this apparatus.

The attachment positions of the powder dispersing plates are indicated by letters A and B in parentheses in Table 1. These letters indicate positions relative to the positions of the powder dispersing plates A or B inside the gas nozzle shown in FIG. 2. The gas nozzle was positioned on the side of the feed pathway for an inorganic powder away from the center of a vertical cross section in a longitudinal direction of the feed pathway at one end of the feed pathway on the side of the powder melting furnace in a straight line a length corresponding to within 10% of an entire length of the feed pathway from the center in the longitudinal direction of the feed pathway.

Mullite powder (synthetic mullite powder, commercially available from Shibata Ceramics) containing $Al_2O_3$ and $SiO_2$ in a total amount of 97% by weight, having a $Al_2O_3/SiO_2$ weight ratio of 1.7 and a water content of 0% by weight was used as a raw material powder. The average particle size of the raw material powder used is as shown in Table 1. The water content was obtained from the amount of weight reduction when 100 g of the powder was heated at 800° C. for one hour.

The raw material powder was introduced into a flame (about 2000° C.) in which LPG (liquefied petroleum gas) is burned in oxygen in a volume ratio of 1.1 using oxygen as the raw material transporting gas, to give monodispersed inorganic spheroidized particles. The ratio $I/I_o$ upon the preparation of each of inorganic spheroidized particles and the spheroidization percentage of the inorganic spheroidized particles obtained are also shown in Table 1.

It can be seen from the comparison of the results in Examples and Comparative Examples shown in Table 1 that an excellent spherical molding sand having a high spheroidization percentage and a particle size ranging from a small particle size to a large particle size is obtained by using the apparatus of the present invention. In particular, it is preferable to use a powder dispersing plate having a shape of a lotus root form or a honeycomb form to obtain spherical molding sand having a large particle size. In addition, all the spherical molding sands obtained in Examples have excellent mono-dispersibility.

According to the present invention, an apparatus for preparing inorganic spheroidized particles capable of efficiently preparing an excellent inorganic spheroidized particle having a high spheroidization percentage even in a case where a raw material powder contains particles having large sizes, and a process for preparing an inorganic spheroidized particle using the apparatus can be provided. In addition, the inorganic spheroidized particle obtained by the process of the present invention can be suitably used for a spherical molding sand, a filler, a pigment or the like, especially in the case where the inorganic spheroidized particle is a ceramics particle.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for preparing an inorganic spheroidized particle, wherein an inorganic powder is fed from a feed pathway for an inorganic powder to a combustion flame in a powder melting furnace, and melted or softened and spheroidized, and wherein the apparatus comprises a powder dispersing plate in the feed pathway for an inorganic powder;

wherein the powder dispersing plate has a porosity of from 25 to 95%.

TABLE 1

| | Number of Power Dispersing Plates and Attachment Position | Properties of Powder Dispersing Plate | | | | | | Average Particle Size of Raw Material Powder (μm) | $I/I_o$ (%) | Spheroidization Percentage (%) |
| | | Position A Inside Gas Nozzle | | | Position A Inside Gas Nozzle | | | | | |
| | | Shape | Porosity (%) | Average Pore Size (mm) | Shape | Porosity (%) | Average Pore Size (mm) | | | |
|---|---|---|---|---|---|---|---|---|---|---|
| Ex. 1 | 1(A) | Mesh | 85 | 2 | — | — | — | 180 | — | 100 |
| Ex. 2 | 2(A · B) | Mesh | 85 | 2 | Mesh | 90 | 3 | 180 | — | 100 |
| Ex. 3 | 2(A · B) | Mesh | 85 | 2 | Mesh | 90 | 3 | 220 | — | 100 |
| Ex. 4 | 2(A · B) | Mesh | 85 | 2 | Mesh | 90 | 3 | 220 | — | 99 |
| Ex. 5 | 1(A) | Lotus Root | 55 | 3 | — | — | — | 280 | — | 99 |
| Ex. 6 | 1(A) | Honeycomb | 80 | 2 | — | — | — | 280 | — | 96 |
| Ex. 7 | 2(A · B) | Lotus Root | 45 | 3 | Lotus Root | 55 | 4 | 350 | 19 | 93 |
| Ex. 8 | 1(A) | Mesh | 75 | 1 | — | — | — | 65 | — | 100 |
| Ex. 9 | 1(A) | Mesh | 70 | 0.5 | — | — | — | 25 | — | 100 |
| Ex. 10 | 1(A) | Mesh | 65 | 0.25 | — | — | — | 5 | — | 100 |
| Comp. Ex. 1 | — | — | — | — | — | — | — | 180 | — | 89 |
| Comp. Ex. 2 | — | — | — | — | — | — | — | 220 | — | 86 |
| Comp. Ex. 3 | — | — | — | — | — | — | — | 280 | — | 77 |
| Comp. Ex. 4 | — | — | — | — | — | — | — | 350 | 100 | 71 |
| Comp. Ex. 5 | — | — | — | — | — | — | — | 25 | — | 84 |

2. The apparatus according to 1, wherein the apparatus comprises at least one powder dispersing plate in the vicinity of one end of the feeding pathway of an inorganic powder on the side of the powder melting furnace.

3. The apparatus according to 1, wherein the powder dispersing plate has a shape of at least one member selected from the group consisting of a mesh form, a lotus root form and a honeycomb form.

4. The apparatus according to 1, wherein the powder melting furnace is connected to a combustion apparatus having a multiple-pipe structure comprising a feed pathway for an inorganic powder, a feed pathway for a fuel gas arranged in the outer circumference of the feed pathway for an inorganic powder, and a feed pathway for a combustion gas arranged in the outer circumference of the feed pathway for a fuel gas, in this order from the center, wherein a connection between the combustion apparatus and the powder melting furnace is made via jetting ports of the feed pathway for an inorganic powder, the feed pathway for a fuel gas and the feed pathway for a combustion gas of the combustion apparatus.

5. The apparatus according to 1, wherein the powder dispersing plate has a porosity of from 45 to 90%.

6. A process for preparing an inorganic spheroidized particle comprising the steps of:
    feeding an inorganic powder into an apparatus from a feed pathway for an inorganic powder to a combustion flame in a powder melting furnace;
    melting or softening and spheroidizing the inorganic powder;
    wherein the apparatus comprises a powder dispersing plate in the feed pathway for an inorganic powder and the powder dispersing plate has a porosity of from 25 to 95%.

7. The process according to claim 6, wherein a ratio of a rate I of inorganic powder particles after passing the powder dispersing plate to a rate $I_0$ of inorganic powder particles before passing the powder dispersing plate, $I/I_0$ (%), satisfies the formula $I/I_0 \leq 50\%$.

8. An apparatus for preparing an inorganic spheroidized particle, wherein an inorganic powder is fed from a feed pathway for an inorganic powder to a combustion flame in a powder melting furnace, and melted or softened and spheroidized, and wherein the apparatus comprises two powder dispersing plates in the feed pathway for an inorganic powder;
    wherein one powder dispersing plate is attached to the vicinity of one end of the feed pathway for an inorganic powder on the feed side of an inorganic powder and the other powder dispersing plate is attached to the vicinity of one end of the feed pathway for an inorganic powder on the side of the powder melting furnace.

9. An apparatus for preparing an inorganic spheroidized particle, wherein an inorganic powder is fed from a feed pathway for an inorganic powder to a combustion flame in a powder melting furnace, and melted or softened and spheroidized, and wherein the apparatus comprises a powder dispersing plate in the feed pathway for an inorganic powder;
    wherein the inorganic powder has a residence time in the powder melting furnace of 0.001 to 5 seconds.

* * * * *

UNITED STATES PATENT AND TRADEMARK OFFICE
CERTIFICATE OF CORRECTION

PATENT NO.       : 7,641,824 B2
APPLICATION NO. : 11/288257
DATED            : January 5, 2010
INVENTOR(S)      : Sakaguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1064 days.

Signed and Sealed this

Twenty-first Day of December, 2010

David J. Kappos
*Director of the United States Patent and Trademark Office*